July 10, 1934.  L. E. RYALL  1,966,047
ELECTRIC MEASURING INSTRUMENT
Filed Jan. 16, 1932
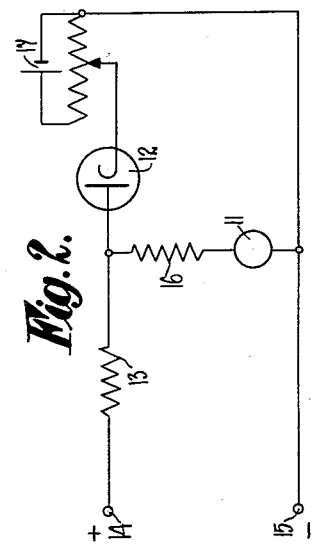
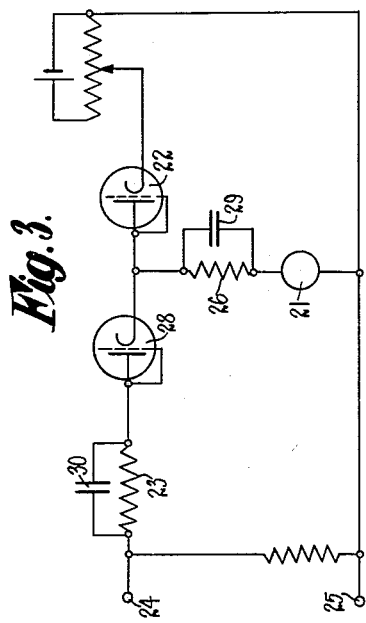
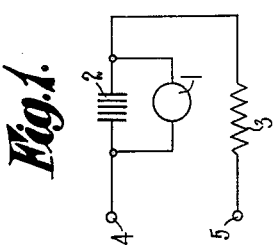
Inventor
Leonard Ernest Ryall
Atty.

Patented July 10, 1934

1,966,047

UNITED STATES PATENT OFFICE 1,966,047

ELECTRIC MEASURING INSTRUMENT

Leonard Ernest Ryall, Surrey, England, assignor to Associated Electric Laboratories, Inc., Chicago, Ill., a corporation of Delaware Application January 16, 1932, Serial No. 587,145
In Great Britain January 23, 1931

3 Claims. (Cl. 171—95)

The present invention relates in general to electrical measuring instruments and more specifically to circuit arrangements employing alternating current rectifiers for use with electrical measuring instruments whereby the same percentage of accuracy may be obtained over the whole of the scale of the instrument.

It is well known that in any form of alternating current rectifier, the impedance is very high, theoretically infinite, if the applied voltage is, for instance, negative and decreases as this applied voltage becomes positive. In a perfect rectifier this change of impedance would occur instantaneously at a certain definite applied voltage, but in the case of most rectifiers such as metal oxide and crystal rectifiers and two electrode thermionic valves, this change of impedance is gradual. The impedance decreases as the applied voltage increases, the relation between the two being approximately logarithmic. Thus if an electrical measuring instrument in series with a suitable resistance is shunted by an alternating current rectifier, as the voltage across the instrument increases the rectifier will shunt an increasing amount of current.

According to one feature of the invention therefore an arrangement for obtaining progressive variation in the sensitivity of a direct current measuring instrument comprises a resistance connected in series with the instrument and a rectifier is connected in shunt therewith.

According to a further feature of the invention in a compensating arrangement employing a rectifier, the variation of impedance of the rectifier in accordance with the voltage applied thereto is utilized to compensate for distortion produced by the departure of the characteristic of a thermionic amplifying valve from rectilinearity.

Since the relation between the change of impedance of the rectifier and the applied voltage is approximately logarithmic it follows that the relation between the current flow through the galvanometer and the applied voltage will also be approximately logarithmic. Thus the divisions on the scale of the measuring instrument will be larger at the zero end than at the other end, the change in the size of the divisions being gradual over the scale. The percentage accuracy of the readings will thus be constant over the whole scale range. A further advantage of this arrangement resides in the fact that since the scale divisions in the upper part of the scale are compressed the range of the instrument is extended, thereby facilitating the measurement of alternating voltages which have a large voltage range such as are met with in telephone speech signals.

The invention will be more fully understood from the following description taken in conjunction with the accompanying drawing comprising Figs. 1-3 which show various embodiments of the invention.

Fig. 1 shows a measuring instrument for measuring direct current, using a metallic rectifier.

Fig. 2 shows a modified form of direct current instrument, using a valve rectifier.

Fig. 3 shows an instrument designed for measuring alternating current voltage, using a valve rectifier.

Referring now to Figs. 1 and 2 these show the invention applied to the measurement of direct-current voltages. In Fig. 1 the galvanometer 1 is connected in shunt of the metallic rectifier 2 which is in series with the direct current supply over an external resistance 3. The current is applied to the circuit over the terminals 4 and 5. The arrangement shown in Fig. 2 is similar in principle to that shown in Fig. 1, but instead of a metallic rectifier, a diode valve 12 is employed connected in shunt of the galvanometer 11 in series with a resistance 16. The galvanometer and resistance are also connected in series with an external resistance 13 and the source of direct current which is supplied over the terminals 14 and 15. A battery 17 is connected across a potentiometer so that the impedance of the valve 12 may be varied independently of the voltage applied across the external resistance. The method of operation of both these circuits is the same; if the potential across the terminals of the rectifier is small, the impedance of the rectifier is high and most of the current passes through the galvanometer. As the potential across the rectifier increases the impedance of the rectifier decreases and proportionately less current passes through the galvanometer.

Referring now to Fig. 3, the arrangement shown therein illustrates the adaptation of the invention for the measurement of alternating voltages. Alternating current is applied to the terminals 24 and 25 and is rectified by a diode valve 28. The rectified current is then applied to a circuit similar to that shown in Fig. 2 and comprising a diode valve 22 shunted by a galvanometer 21 in series with a resistance 26. Both the series resistance 26 and the external resistance 23 are shunted by smoothing condensers 29 and 30 respectively. Current is fed to the diode 22 from a potentiometer for the same purpose as that described in connection with Fig. 2. In this case the impedance of the shunting diode is very high if there is no alternating current input but commences to fall immediately rectified current, derived from the alternating current, flows through the galvanometer.

A further application of the invention relates to the correction of valve distortion due to the curvature of the valve characteristic. The fact that the valve characteristic is not straight results in the plate voltage not being directly proportional to the grid voltage, the positive halves of the waves being diminished in relation to the negative halves if the valve is working on the lower bend. If, however, a rectifier is incorporated in the plate circuit and the impedance of the rectifier decreases as the plate current increases, the voltage changes across the rectifier can be made with suitable choice of values to correspond more closely with the voltage changes applied to the grid.

It will be understood that the invention is not limited to the precise applications detailed above but may have further applications all coming within the scope of the invention.

What I claim as new and desire to secure by Letters Patent is:

1. An arrangement for measuring alternating current over a wide range of values on a single instrument, which comprises a direct current instrument, a rectifier connected in series with said instrument and the current source, and a second rectifier connected in shunt of said instrument.

2. An arrangement for measuring alternating currents, comprising a resistance bridged across the leads from the source of the current to be measured, a direct current instrument and a rectifier connected in series with each other and in shunt of said resistance, and a second rectifier connected in shunt of said instrument.

3. A measuring set for transmission lines, comprising an amplifier, a resistance in the output of said amplifier, a rectifier and a galvanometer connected in series with each other and in shunt of said resistance, and a second rectifier connected in shunt of said galvanometer.

LEONARD ERNEST RYALL.